ated Dec. 14, 1920.

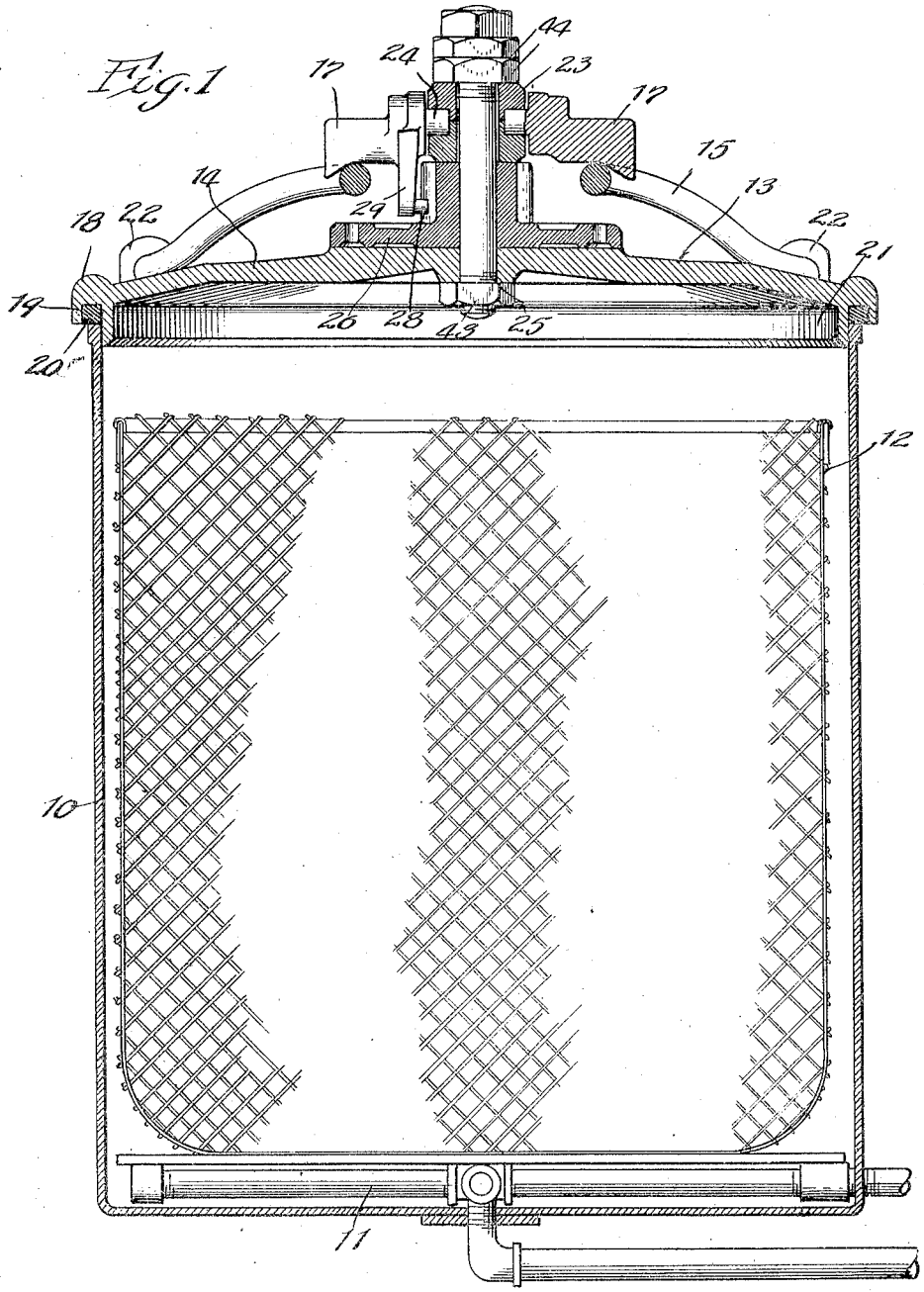

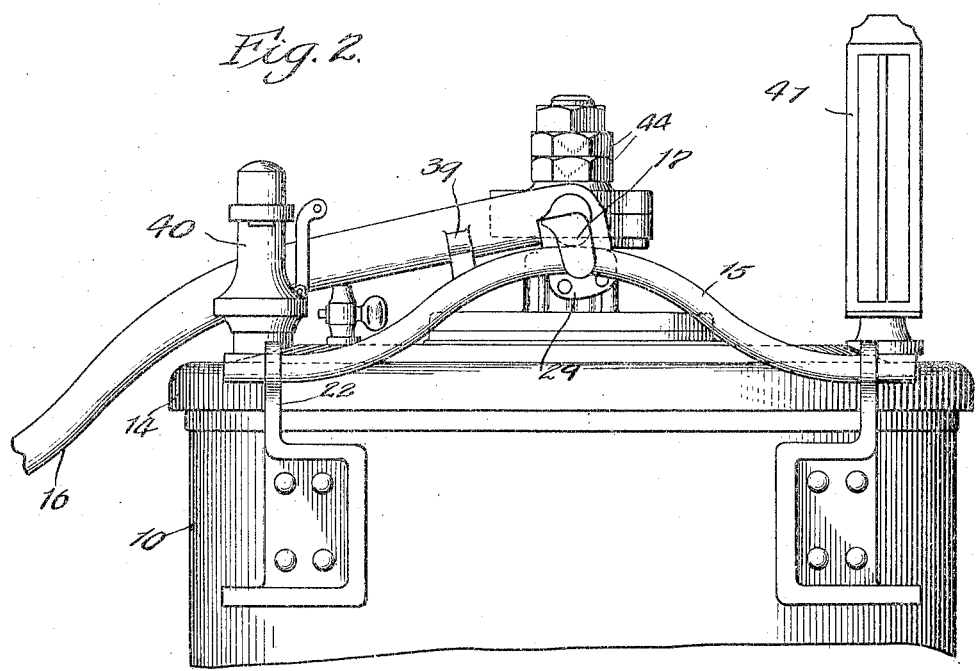
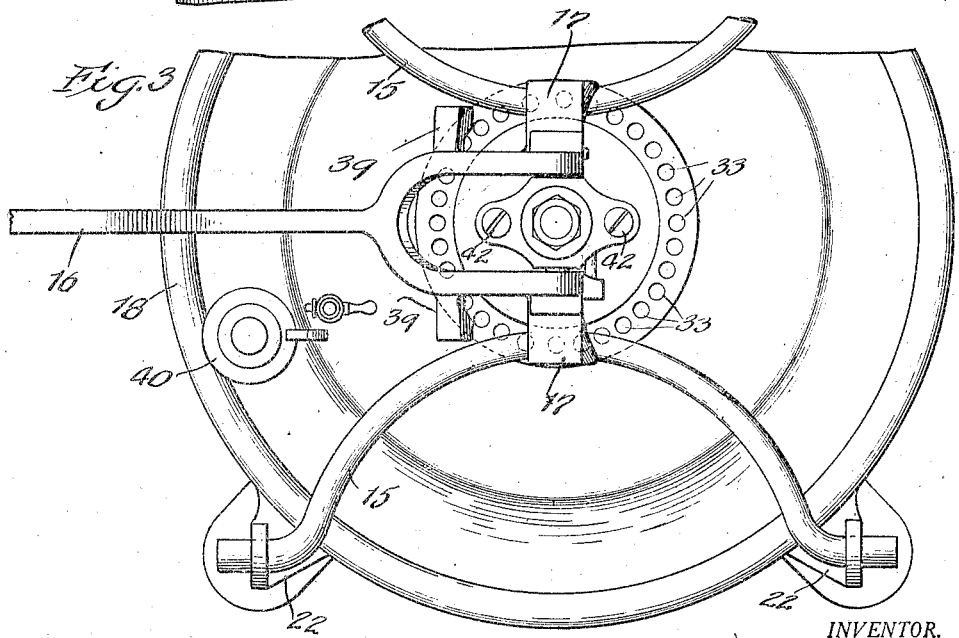

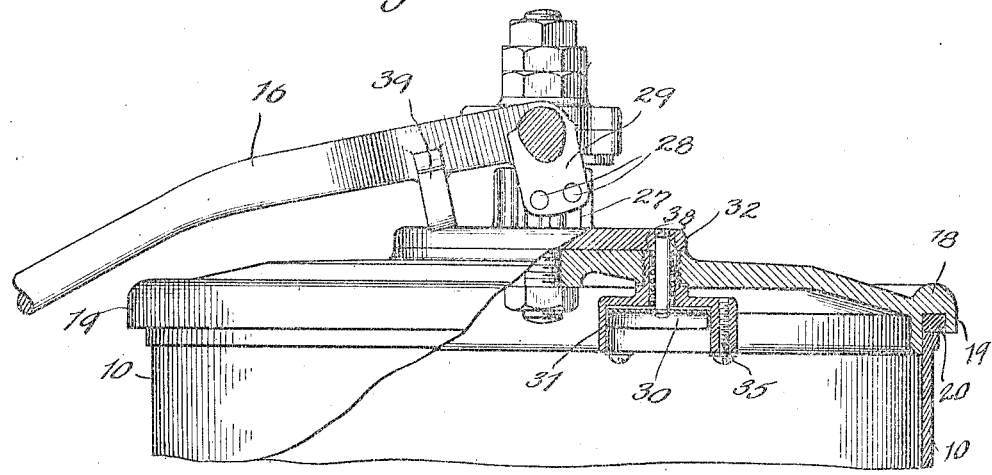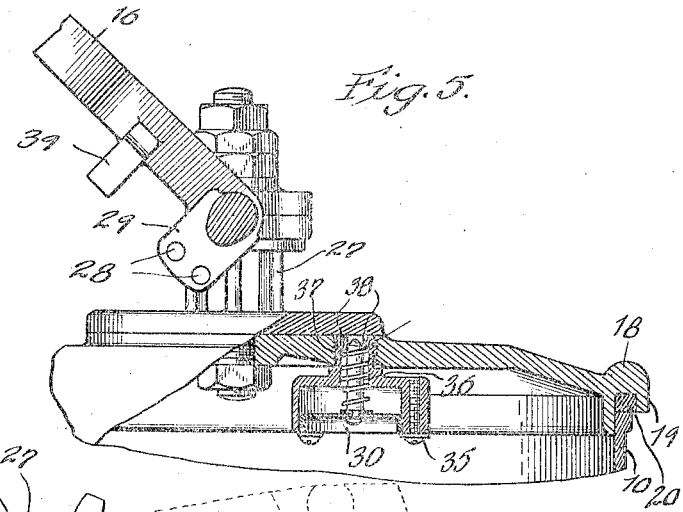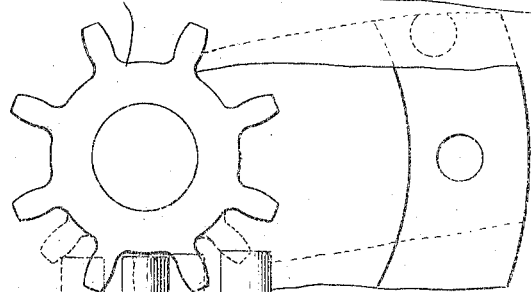

UNITED STATES PATENT OFFICE.

JAMES F. WHITAKER, OF HOOPESTON, ILLINOIS, ASSIGNOR TO SPRAGUE CANNING MACHINERY COMPANY, OF CHICAGO, ILLINOIS, A CORPORATION OF ILLINOIS.

PROCESS-KETTLE.

1,361,946.    Specification of Letters Patent.    Patented Dec. 14, 1920.

Application filed December 2, 1916. Serial No. 134,717.

*To all whom it may concern:*

Be it known that I, JAMES F. WHITAKER, a citizen of the United States, residing at Hoopeston, in the county of Vermilion and State of Illinois, have invented new and useful Improvements in Process-Kettles, of which the following is a full, clear, concise, and exact description, reference being had to the accompanying drawing, forming a part of this specification.

My invention relates to process kettles and the like.

One of the objects of my invention is to provide an improved means whereby the cover of the process kettle cannot be removed as long as there is any appreciable pressure within the kettle.

Further objects will appear from the detailed description to follow and from the appended claims.

In the drawings, in which one form of my invention is shown,

Figure 1 is a vertical axial section of a process kettle embodying my invention;

Fig. 2 is a side elevation of the upper part of the process kettle;

Fig. 3 is a top plan view of the kettle;

Fig. 4 is a fragmentary sectional view of the upper part of the kettle showing the pressure actuated plunger, and showing the closure in sealing position;

Fig. 5 is a view similar to Fig. 4, but showing the closure released; and

Fig. 6 is a fragmentary plan view showing the locking plate and pinion.

Referring to the drawings in detail, the processing apparatus shown comprises a sheet metal receptacle 10, heating coils or pipes 11 at the bottom of the receptacle 10, a basket 12, in which the cans are placed, and closure means 13 for sealing the open upper end of the receptacle 10.

The closure means 13 comprise the metal lid or cover, 14, a pair of bails 15, pivotally mounted on the receptacle 10, and a manually actuated handle or arm, 16, provided with lateral extensions 17, forming cam portions for engaging the bails 15 to cause them to bear on the lid 14, to force the lid into sealing engagement with the receptacle 10. The upper, outer edge of the lid, 14, is provided with an annular bead or flange 18, which reinforces the lid at this point and also affords a bearing for the bails 15. The lower outer portion of the lid 14 is provided with an annular channel 19 in which is located a packing ring 20 which engages the upper edge of the receptacle 10. The lid 14 is also provided with an annular flange 21, which fits inside the receptacle 10 to position the lid on the receptacle. The bails 15 are mounted in lugs 22 secured to the sides of the receptacle 10.

In order that the handle 16 may be swung around to its proper position with respect to the bails 15, no matter in what position the lid 14 may be placed on the receptacle, it is mounted to swivel with respect to the lid 14. For this purpose, the bearing 23 in which the pintles or trunnions 24 are mounted, is swiveled on a shaft or pin 25, which is secured to the lid 14.

In order to prevent accidents, means are provided for preventing the removal of the lid 14 so long as there is any appreciable steam pressure in the container 10. These means comprise an apertured plate 26 rotatably mounted on the pin 25, having a pinion 27 formed integral therewith on its upper face, for engagement with a pair of pins 28 mounted on an arm 29 carried by the handle 16, and a steam pressure actuated piston or plunger 30 slidably mounted in a cylinder 31, and having secured thereto, a locking pin 32, for coöperation with the openings 33 in the plate 26. The cylinder 31 has a reduced threaded portion 34 which is screwed into the lid 14 to hold the cylinder in place on the lid. To prevent the piston 30 from dropping out of the cylinder 31 when there is no steam pressure in the receptacle 10, a number of screws 35 may be threaded into the walls of the cylinder 31, the heads of these screws being located in position to be engaged by the piston 30 when in its lower-most position (Fig. 5). To insure the withdrawal of the pin 32 from the opening 33 in which it may have entered, a coil-spring 36 may be provided surrounding the pin 32, and having one end bearing against a shoulder 37 formed in the reduced threaded portion 34, and its other end bearing on the piston 30. In order to permit the escape of the air, above the piston 30, as it moves up from the position shown in Fig. 5, vent holes 38 may be provided in the threaded portion 34.

In order to prevent swiveling movement of the handle 16 about the pin 25 when the handle is in sealing position, as in Figs. 2, 3, and 4, the handle is provided with a pair of laterally projecting lugs 39, which in the sealing position of the handle 16 extend so close to the bails 15 as to prevent any appreciable swiveling movement.

The cover of the receptacle may be provided with a safety valve 40 and thermometer 41 of any suitable types. The bearing 23 is made in two parts to permit its assembly with respect to the pintles or trunnions 24, and these two parts may be held together by means of screws 42. The pin 25 is held in place on the lid 14 by means of a nut 43 and the bearing 23 is held in place on the pin 25 by means of nuts 44.

The operation of my improved device is as follows:

The canned goods are placed in the basket 12, the receptacle 10 is filled with water to a suitable height, the lid 14 is placed in position on the receptacle 10, the bails 15 are swung up over the lid 14, the handle 16 is swung about the pin 25 until the cam members 17 are in proper position to engage the bails 15 and the handle 16 is then pressed down to cause the cam members 17 to engage the bails 15, to cause these bails to bear on the bead 18 of the cover 14 to force the cover into sealing engagement with the receptacle 10.

As the handle 16 is forced down, the pins 28 on the arm 29 engage the teeth of the pinion 27, causing the pinion 27 and apertured plate 26 to rotate about the pin 25.

Steam is then turned into the heating pipes 11 causing the water in the receptacle 10 to boil. The steam pressure in the receptacle forces the piston 30 up, causing the pin 32 to enter one of the openings 33 in the plate 26. This locks the plate 26 against rotation, and consequently prevents the handle 16 from being lifted, as the pins 28 are in engagement with the teeth of the pinion 27, which is held from rotation. If it should happen that none of the apertures 33 were in position to register with the pin 36 and it was attempted to raise the handle 16, it could be raised only far enough to rotate the plate 26 until one of the openings 33 registered with the pin 32, when the pressure of the steam against the piston 30 would force the pin 32 up into the registering openings 33 preventing further raising of the handle 16.

The handle 16 cannot be raised sufficiently to destroy the sealing engagement between the lid 14 and the receptacle 10 nor can it be raised high enough to bring the lugs or stops 39 above the level of the bails 15, so that the handle cannot be swung sidewise about the pin 25, so long as there is any appreciable steam pressure in the receptacle 10.

After the canned goods have been processed long enough, the steam is turned off from the pipes 11, and the steam pressure in the receptacle 10 dies down. When the pressure has completely or substantially died down the spring 36 forces the piston 30 down causing the locking pin 32 to be withdrawn from the registering aperture 33 in the locking plate 26. The handle 16 can then be raised to free the bails 15 which are swung out of the way. The lid 14 can then be lifted off, and the processed goods removed from the receptacle 10.

Having thus described my invention what I claim as new and desire to secure by Letters Patent is:—

1. The combination with a cooking receptacle having an opening and a closure therefor, of means for manually forcing said closure into sealing engagement with said receptacle and means controlled by the steam pressure in the receptacle for preventing the removal of said closure so long as there is any appreciable steam pressure in the receptacle, said preventing means comprising means for retaining said manually actuated means in position to hold the closure in sealing position.

2. The combination with a cooking receptacle having an opening and a closure therefor, of means for manually forcing said closure into sealing engagement with said receptacle and means controlled by the steam pressure in the receptacle for preventing the removal of said closure so long as there is any appreciable steam pressure in the receptacle, said preventing means comprising means for retaining said manually actuated means in position to hold the closure in sealing position, said manually actuated means comprising a member pivotally mounted on said receptacle and bearing on said closure, when in sealing position.

3. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means comprising means for retaining said manually actuated means in position to hold the closure in sealing position, said manually controlled means comprising a pair of bails, pivotally mounted on said receptacle, and bearing on said closure when in sealing position.

4. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means comprising means for retaining said manually actuated means in position to hold the closure in sealing position, said manually controlled means comprising a pair of bails, pivotally mounted on said receptacle, and bearing on said closure when in sealing position, and a pivoted arm for actuating said bails.

5. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means comprising means for retaining said manually actuated means in position to hold the closure in sealing position, said manually controlled means comprising a pair of bails, pivotally mounted on said receptacle, and bearing on said closure when in sealing position, and a pivoted arm for actuating said bails, said preventing means comprising also a member actuated by said arm, and a pressure actuated member for engaging said arm-actuated member, for holding it against movement.

6. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means, comprising a first member actuated by said manually actuating means and a pressure actuated member for engaging said first member for holding it against movement.

7. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means, comprising an apertured first member actuated by said manually actuated means and a pressure actuated member for entering an aperture in first member for holding it against movement.

8. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said manually actuated means comprising a pair of bails pivotally mounted on said receptacle and bearing on said closure member when in sealing position, a member swiveled on said closure, and an arm pivoted on said swiveled member for actuating said bails, said preventing means comprising means for retaining said manually actuated means in position to hold the closure in sealing position.

9. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said manually actuated means comprising a pair of bails pivotally mounted on said receptacle and bearing on said closure member when in sealing position, a member swiveled on said closure, and an arm pivoted on said swiveled member for actuating said bails, said preventing means comprising means for retaining said manually actuated means in position to hold the closure in sealing position and for preventing swiveling movement of said swiveled member when the parts are in sealing position.

10. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said manually actuated means comprising a pair of bails pivotally mounted on said receptacle and bearing on said closure member when in sealing position, a member swiveled on said closure, and an arm pivoted on said swiveled member for actuating said bails, said preventing means comprising means for retaining said manually actuated means in position to hold the closure in sealing position and for preventing swiveling movement of said swiveled member when the parts are in sealing position, comprising a stop carried by said arm for engagement with one of said bails.

11. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means comprising means for retaining said manually actuated means in position to hold the closure in sealing position, said manually controlled means comprising a pair of bails, pivotally mounted on said receptacle, and bearing on said closure when in sealing position, and a pivoted arm for actuating said bails, said preventing means comprising also a toothed member actuated by said arm, and comprising also a pressure actuated member for engaging said arm-actuated member, for holding it against movement.

12. The combination with a cooking receptacle having an opening and a closure therefor, of manually actuated means for forcing said closure into sealing engagement with said receptacle and means controlled by the steam pressure in the receptacle for preventing the removal of said closure so long as there is any appreciable steam pressure in the receptacle, said preventing means, comprising a rotatable toothed apertured first member actuated by said manually actuating means and a pressure actutuated member for entering the aperture in said first member for holding it against movement.

13. The combination with a cooking receptacle having an opening therein and a closure therefor, of means for manually forcing said closure into sealing engagement with said receptacle and means actuated by the steam pressure in the receptacle for locking said forcing means in sealing position.

In witness whereof I have hereunto subscribed my name.

JAMES F. WHITAKER.

Witnesses:
 JOHN B. WALLBRIDGE,
 P. D. HART.